United States Patent [19]
Hayashida et al.

[11] Patent Number: 6,007,251
[45] Date of Patent: Dec. 28, 1999

[54] BEARING MANUFACTURING METHOD AND BEARING WITHOUT OXIDE UNDER LUBRICANT

[75] Inventors: Kazunori Hayashida, Osakasayama; Hiroaki Takebayashi, Yao; Shoji Eguchi, Kitakatsuragi-gun; Kouichi Okuda, Minamikawachi-gun, all of Japan

[73] Assignee: Koyo Seiko Co., Ltd., Osaka, Japan

[21] Appl. No.: 09/072,918

[22] Filed: May 6, 1998

[30] Foreign Application Priority Data

May 9, 1997 [JP] Japan ................................. 9-119183

[51] Int. Cl.$^6$ .......................... F16C 33/62; F16C 33/64
[52] U.S. Cl. ...................... 384/492; 384/463; 384/625
[58] Field of Search ................. 384/463, 464, 384/492, 569, 573, 527, 625, 907, 910, 912, 913

[56] References Cited

U.S. PATENT DOCUMENTS

| | | |
|---|---|---|
| 1,755,686 | 4/1930 | De Jahn et al. ........................ 384/625 |
| 3,561,828 | 2/1971 | Glenn ....................................... 384/463 |
| 3,632,368 | 1/1972 | Nelson ..................................... 427/190 |
| 4,508,396 | 4/1985 | Doi et al. ................................. 384/463 |
| 4,871,266 | 10/1989 | Oda ..................................... 384/463 X |
| 4,975,147 | 12/1990 | Tahara et al. ........................... 156/646 |
| 5,284,394 | 2/1994 | Lemelson ................................ 384/463 |

*Primary Examiner*—Thomas R. Hannon
*Attorney, Agent, or Firm*—Wenderoth, Lind & Ponack L.L.P.

[57] ABSTRACT

There is provided a method for manufacturing a bearing, which has increased adhesive strength of lubricant to surfaces of rolling elements, a surface of a raceway or a surface of a cage. A surface of a ball, a raceway surface of an inner ring and a raceway surface of an outer ring are subjected to fluoride coating substitution process or ion bombardment process so that their oxygen concentration becomes not more than 2 ppm/mm$^2$, by which surface oxide is removed. After the removal of the oxide, the surfaces are coated with a solid lubricant of silver, lead or the like. The surfaces from which oxide has been removed have good lubricant adhesion, making breaks in the lubricant unlikely to occur. Thus, the life of the bearing is prolonged.

8 Claims, 2 Drawing Sheets

BEARING MANUFACTURING METHOD AND BEARING WITHOUT OXIDE UNDER LUBRICANT

BACKGROUND OF THE INVENTION

The present invention relates to a method for manufacturing a bearing, and a bearing resulting therefrom, which is to be used under a high vacuum or under a high temperature such as in semiconductor manufacturing equipment.

Generally, bearings, when used under severe conditions such as vacuums, high temperatures and low temperatures, involve the use of solid lubricants. These solid lubricants are classified roughly into soft metal based ones, layered material based ones and high polymer based ones. Further, the soft metals are subdivided into gold, silver and lead, the layered materials are subdivided into $MoS_2$ and graphite, and the high polymers are subdivided into PTFE (polytetrafluoroethylene), nylon, polyimide and the like. In particular, when the equipment employing the bearing is used under a high vacuum or high temperature, soft metal based solid lubricants are used, where silver is used for high temperatures by virtue of its superior durability and lead is used for ultra-low temperatures because it does not lose lubricity. Besides, with the use of a solid lubricant, too large a thickness of the solid lubricant would obstruct the rolling of the rolling element, while too thin a thickness would cause the lubricant to break. Accordingly, the thickness of the lubricant is adjusted to an appropriate one.

However, even with an appropriate thickness of the lubricant, if the adhesive strength of the lubricant to a surface to be lubricated is weak, the lubricant is more likely to break, resulting in a shortened service life of the bearing. On this account, in determining the bearing performance, adhesive strength of the coated lubricant onto the lubricated surface is a very important element for a decision as to the life of the bearing.

FIG. 2A is a partial sectional view of a ball 4 which is a conventional rolling element. For enhancement of the adhesive strength of a lubricant 12 to the ball 4, the ball 4 is cleaned with an organic solvent or the like so that contaminations such as fats and oils (not shown) are removed, and then the surface of the ball 4 is coated with the lubricant 12. Like this, the conventional bearing to be used under a high vacuum or high temperature has been manufactured through steps of cleaning the surface of the ball 4, the surface of a raceway (not shown), the surface of a cage (not shown) or the like with an organic solvent or the like, and thereafter coating the surface with a solid lubricant of silver, lead or the like, with the aim of increasing the adhesive strength of the lubricant 12 to the ball 4 or the raceway.

However, with the conventional bearing manufacturing method described above, although fats and oils or the like are relatively easily removed from the surfaces of the ball 4, the raceway and the like with an organic solvent, it is quite hard to remove oxide 11 from the surfaces. If the oxide 11 remains unremoved, there would occur a problem of deteriorated adhesion of the lubricant 12 due to the presence of the oxide 11. With deteriorated adhesion of the lubricant 12, a phenomenon would occur early that the coating of the lubricant 12 breaks during the rolling of the ball 4. Then, with the coating of the lubricant 12 broken, the ball 4 would make direct contact with the inner ring, the outer ring or the cage at the broken places, which would cause the rolling performance of the bearing to be considerably impaired. This would lead to a problem of shortened life of the bearing.

SUMMARY OF THE INVENTION

The object of the present invention is therefore to provide a method for manufacturing a bearing, and a bearing resulting from the method, which has been increased in the adhesive strength of lubricant to the surface of the rolling element, the surface of the raceway or the surface of the cage.

In order to achieve the above object, the present invention provides a method for manufacturing a bearing, comprising:
cleaning at least one of a surface of a rolling element, a surface of a raceway or a surface of a cage, if any, so that oxygen concentration becomes not more than a specified value; and thereafter
coating the cleaned surface with a lubricant.

As shown above, in the bearing manufacturing method of the present invention, at least one of the surface of the rolling element, the surface of the raceway or the surface of the cage is cleaned so that oxygen concentration thereof becomes not more than a specified value, and thereafter the cleaned surface is coated with a lubricant. Therefore, the lubricant strongly adheres to the surface having an oxygen concentration which is not more than the specified value. As a result, the bearing manufactured by this method comes to have a prolonged life.

In the bearing manufacturing method according to one embodiment, the specified value is 2 $ppm/mm^2$.

With the bearing manufacturing method of the embodiment, the surface having an oxygen concentration of not more than 2 $ppm/mm^2$ is coated with the lubricant. When the oxygen concentration is not more than 2 $ppm/mm^2$, the lubricant strongly adheres to the surface so that the life of the bearing becomes a maximum. This was found out by experiments.

The bearing according to the present invention is characterized in that at least one of a rolling element, a raceway or a cage (when used) has a surface portion with oxygen concentration not more than 2 $ppm/mm^2$, the surface portion being coated with a lubricant.

As shown above, in the bearing of the present invention, since at least one of the rolling element, the raceway or the cage has a surface portion with oxygen concentration not more than 2 $ppm/mm^2$ coated with a lubricant, the lubricant strongly adheres to the surface portion. Therefore, the life of this bearing is prolonged. In addition, it has been found out by experiments that as the oxygen concentration approaches 2 $ppm/mm^2$, the life of the bearing grows longer, but that with the oxygen concentration below 2 $ppm/mm^2$, the life does not change much as it keeps around a maximum.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in more detail by embodiments illustrated in the accompanying drawings.

Figure 1:
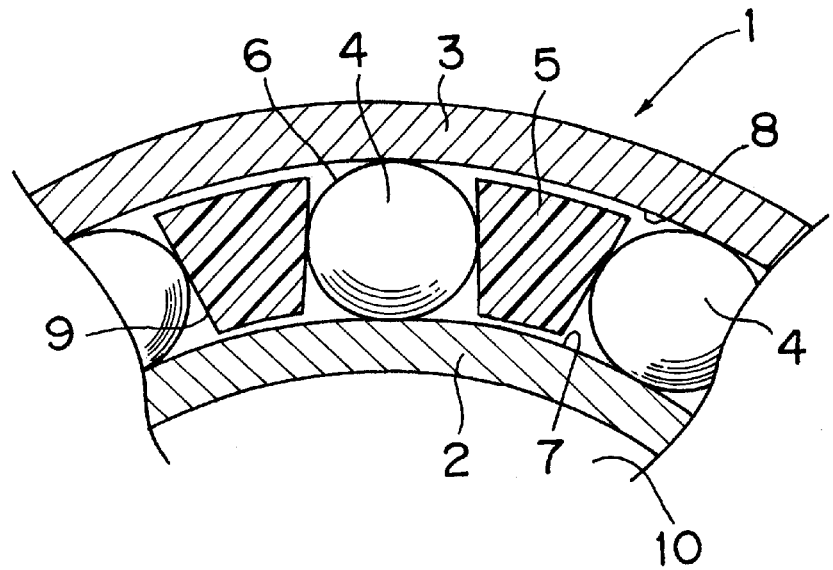
FIG. 1 is a partial sectional view of a rolling bearing of the present invention.

FIG. 1 shows a partial cross section of a rolling bearing 1. This rolling bearing 1 comprises a metallic inner ring 2 as a raceway, a metallic outer ring 3 as a raceway, steel balls 4 as a rolling element placed between these inner ring 2 and outer ring 3, and a plastic cage 5 for retaining these balls 4.

A surface 6 of the ball 4, a raceway surface 7 of the inner ring 2, a raceway surface 8 of the outer ring 3 and a surface 9 of the cage 5 facing a pocket are coated with a lubricant (not shown in FIG. 1) in the following manner.

First, before assembling to the state of FIG. 1, the ball 4, the inner ring 2, the outer ring 3 and the cage 5 are cleaned with an organic solvent or the like, by which oily contaminations are preliminarily removed.

After that, oxide is removed from the surfaces of the metallic ball 4, metallic inner ring 2 and metallic outer ring 3 by fluoride coating substitution.

In this fluoride coating substitution process, firstly the ball 4, the inner ring 2 and the outer ring 3 are put into a heating furnace and increased in temperature to 300 to 500° C. Then, with this temperature held, fluoric gas is introduced into the heating furnace, in which state the ball 4, the inner ring 2 and the outer ring 3 are heated for about 0.5 to 1 hour. As a result, an inert coating composed mainly of oxide on the ball 4, the inner ring 2 and the outer ring 3 is changed into a fluoride coating. Next, after the fluoric gas is evacuated, those are heated to 500 to 700° C. and $H_2$ gas is blown in, by which the fluoride coating reacts with $H_2$, thereby being decomposed and removed. In this way, the fluoride coating on the ball 4, the inner ring 2 and the outer ring 3 is removed, that is, the oxide on the metal surfaces is removed, with the result that an activated metallic substrate appears to the surface.

Figure 2A:
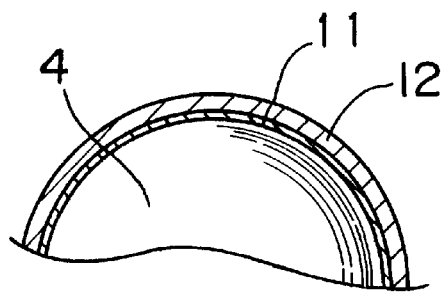
FIG. 2A shows a partial sectional view of a ball with oxide present on a surface of a conventional ball.
Figure 2B:
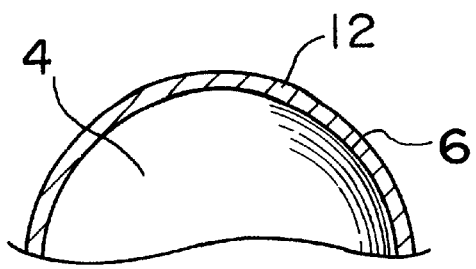
FIG. 2B shows a partial sectional view of a ball of the present invention from which oxide has been removed.

Subsequently, the surfaces of the ball 4, the inner ring 2 and the outer ring 3, from which oxide has been removed by the above fluoride coating substitution process, are coated with a solid lubricant of silver, lead or the like. On the ball 4, as shown in FIG. 2B, a lubricant 12 strongly adheres to the metallic substrate having no oxide thereon. The lubricant also strongly adheres to the inner ring 2 and the outer ring 3 likewise, though not shown in FIG. 1. Meanwhile, the surface 9 of the cage 5 facing the pocket is also coated with the lubricant (not shown in FIG. 1).

A vacuum four-ball test was conducted in order to quantitatively determine the adhesive property of the lubricant 12 to the surface of the ball 4, from which oxide has been removed by the fluoride coating substitution process as described above. In this test, for investigation of the relationship between the adhesive property of lubricant and the amount of oxide on the metal surface, the relationship between torque life and surface oxide concentration was tested.

Test conditions for this test are as follows.

Test conditions for the vacuum four-ball test:
    Steel ball diameter: ¼ inch (6.35 mm)
    Steel ball material: stainless steel SUS440C
    Lubricant: 0.3 μm thick silver
    Pressure: $6 \times 10^{-4}$ Pa
    Load: 196 N
    Rotating speed: 132 rpm (0.025 m/s)
    Temperature: room temperature In this test, as shown below, A–E five types of test steel balls, different from one another in the amount of oxide on the metal surface, were manufactured each four in number by the above-described manufacturing method. It is noted that surface oxygen concentration was used as the amount of oxide on the metal surface.

Surface oxygen concentration of balls:
    A steel ball: 1.5 ppm/mm$^2$
    B steel ball: 2.2 ppm/mm$^2$
    C steel ball: 2.9 ppm/mm$^2$
    D steel ball: 4.3 ppm/mm$^2$
    E steel ball: 5.1 ppm/mm$^2$ For each of the A–E steel balls, three out of the four steel balls are fixed to unshown test equipment in a state of contact with one another, while the remaining one was fixed to a drive shaft, in which a load was applied from above the three fixed steel balls. By rotating the drive shaft, a frictional force that occurred between the three fixed steel balls and the one driven steel ball was detected by a strain gauge.

Figure 3:
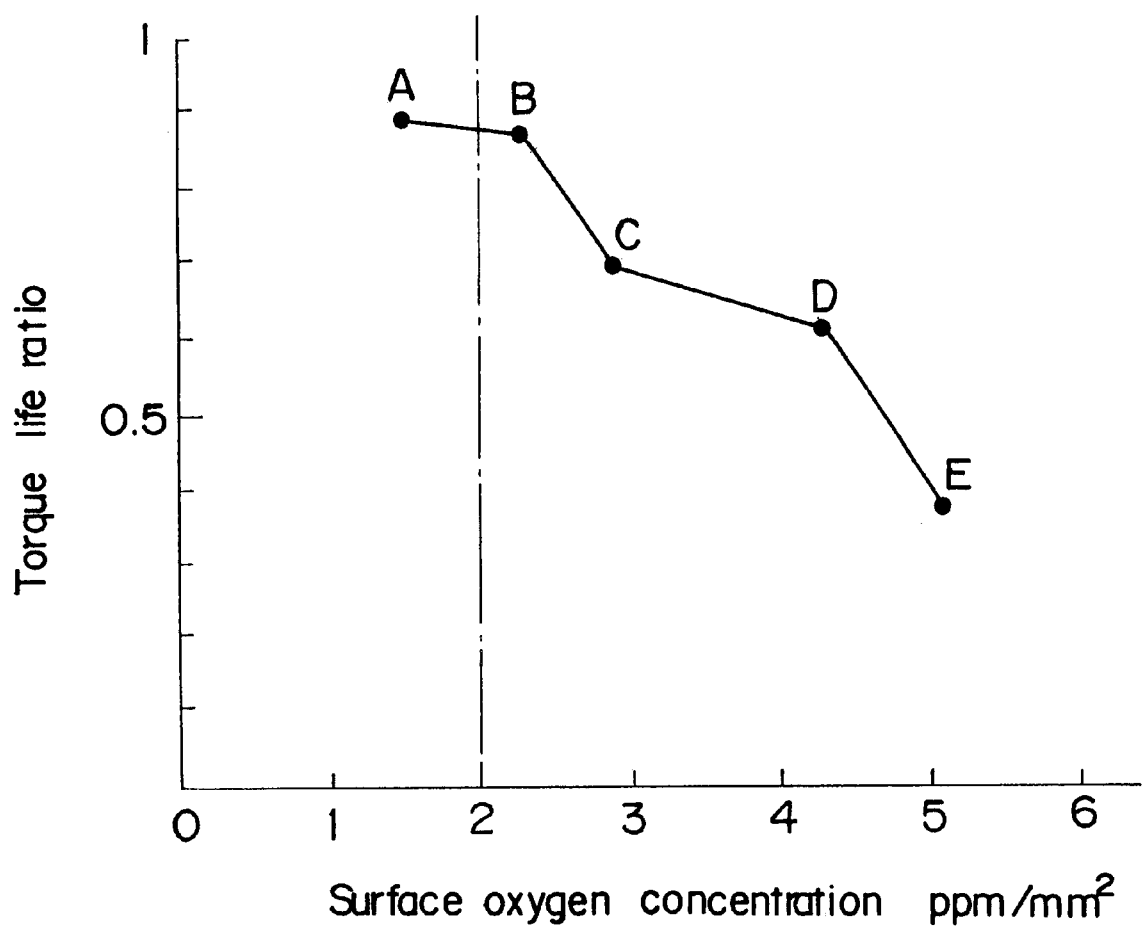
FIG. 3 shows the relationship between surface oxygen concentration and torque life ratio in the ball of the present invention.

FIG. 3 shows a relationship between surface oxygen concentration and torque life ratio, which is the result of this test. As shown in the figure, A steel ball and B steel ball with surface oxygen concentration 1.5 and 2.2 ppm/mm$^2$, respectively, exhibited torque life ratios of about 0.88 and 0.86, respectively, while C steel ball with surface oxygen concentration 2.9 ppm/mm$^2$ exhibited a torque life ratio of about 0.68. That is, the torque life ratio showed a sharp drop after B steel ball. Further, D steel ball exhibited a continuing decrease, and E steel ball with surface oxygen concentration 5.1 ppm/mm$^2$ exhibited a drop to a torque life ratio as low as about 0.35.

From the above, it can be understood that with surface oxygen concentration not more than 2 ppm/mm$^2$, the torque life ratio becomes a large enough value as much as about 0.87 or more, which means a good adhesive property of the lubricant to the surface. In addition, with the surface oxygen concentration not more than 2 ppm/mm$^2$, the life remained almost unchanged as can be seen from FIG. 3.

In the above embodiment, contaminations such as oxide have been removed by fluoride coating substitution process. However, other surface oxide removal processes may be applied instead of the fluoride coating substitution process. For example, it is possible to apply an ion bombardment process taking advantage of the fact that a conductive material which is biased to negative high voltage with glow discharge maintained in a 0.1–1 Pa argon or active atmosphere is cleaned by ions.

In the above embodiment, the surface of the ball 4 and the raceway surfaces of the inner and outer rings 2 and 3, from which oxide has been removed, are coated with lubricant 12. However, in the case of a metallic cage, it is also possible to remove oxide from the surface of the pocket of the cage and coat the surface with a lubricant. The present invention, as a matter of course, may be applied to bearings which do not employ cages.

As apparent from the above description, in the bearing manufacturing method of the present invention, at least one of the surface of the rolling element, the surface of the raceway or the surface of the cage is cleaned so that oxygen concentration becomes not more than a specified value, and thereafter the cleaned surface is coated with a lubricant. Therefore, the lubricant strongly adheres to the surfaces having an oxygen concentration which is not more than the specified value. As a result, the bearing manufactured by this method comes to have a prolonged life.

In the bearing manufacturing method according to one embodiment, the surface having an oxygen concentration of not more than 2 ppm/mm$^2$ is coated with a lubricant. Therefore, the lubricant strongly adheres to the surface so that the life of the bearing can be remarkably prolonged.

In the bearing of the present invention, at least one of the rolling element, the raceway or the cage has a surface portion having an oxygen concentration of not more than 2 ppm/mm$^2$, and the surface portion is coated with a lubricant. Therefore, the lubricant strongly adheres to the surface portion so that the life of this bearing can be prolonged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing wherein at least one of a rolling element, a raceway and a cage has a surface portion with an oxygen concentration of not more than 2 ppm/mm$^2$, the surface portion being coating with a lubricant.

2. A bearing wherein at least one of a rolling element and a raceway has a surface portion with an oxygen concentration of not more than 2 ppm/mm$^2$, the surface portion being coated with a lubricant.

3. A method for manufacturing a bearing, comprising:
cleaning at least one of a surface of a rolling element, a surface of a raceway and a surface of a cage, to reduce an oxygen concentration of the surface to not more than 2 ppm/mm$^2$; and thereafter coating the cleaned surface with a lubricant.

4. A method for manufacturing a bearing as claimed in claim 3, wherein the cleaning is performed by a fluoride coating substitution process.

5. A method for manufacturing a bearing as claimed in claim 3, wherein the cleaning is performed by an ion bombardment process.

6. A method for manufacturing a bearing, comprising:
cleaning at least one of a surface of a rolling element and a surface of a raceway to reduce an oxygen concentration of the surface to not more than 2 ppm/mm$^2$; and thereafter coating the cleaned surface with a lubricant.

7. A method for manufacturing a bearing as claimed in claim 6, wherein the cleaning is performed by a fluoride coating substitution process.

8. A method for manufacturing a bearing as claimed in claim 6, wherein the cleaning is performed by an ion bombardment process.

* * * * *